(12) United States Patent
Hulkkonen et al.

(10) Patent No.: US 9,137,760 B2
(45) Date of Patent: Sep. 15, 2015

(54) OTHER-CELL INTERFERENCE-BASED UPLINK CONTROL

(75) Inventors: Jari Hulkkonen, Oulu (FI); Olli Piirainen, Oulu (FI); Kari Niemela, Oulu (FI); Mikko Saily, Sipoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 2081 days.

(21) Appl. No.: 11/728,180

(22) Filed: Mar. 22, 2007

(65) Prior Publication Data

US 2007/0287444 A1    Dec. 13, 2007

Related U.S. Application Data

(60) Provisional application No. 60/793,419, filed on Apr. 19, 2006.

(51) Int. Cl.
*H04W 4/00* (2009.01)
*H04W 52/24* (2009.01)
*H04W 52/32* (2009.01)
*H04B 17/345* (2015.01)

(52) U.S. Cl.
CPC ............ *H04W 52/243* (2013.01); *H04B 17/345* (2015.01); *H04W 52/322* (2013.01)

(58) Field of Classification Search
CPC ............ H04W 52/00; H04W 52/0238; H04W 52/0245; H04W 52/16; H04W 52/223; H04W 52/244

USPC .............. 455/422.1, 13.4, 67.13, 561, 114.2, 455/67.11, 127.1
See application file for complete search history.

(56) References Cited

U.S. PATENT DOCUMENTS

| | | | |
|---|---|---|---|
| 6,292,471 B1 | 9/2001 | Cao et al. | |
| 6,999,760 B2 * | 2/2006 | Dhainaut | 455/422.1 |
| 2005/0003846 A1 | 1/2005 | Anderson | |
| 2005/0031019 A1 * | 2/2005 | Itoh | 375/142 |
| 2006/0019694 A1 * | 1/2006 | Sutivong et al. | 455/522 |
| 2006/0211441 A1 * | 9/2006 | Mese et al. | 455/522 |
| 2006/0234752 A1 * | 10/2006 | Mese et al. | 455/522 |
| 2007/0191046 A1 * | 8/2007 | Catreux-Erceg et al. | 455/522 |

FOREIGN PATENT DOCUMENTS

| | | |
|---|---|---|
| GB | 2353670 | 2/2001 |
| GB | 2 362 785 | 11/2001 |

* cited by examiner

*Primary Examiner* — Vladimir Magloire
*Assistant Examiner* — Sayed T Zewari
(74) *Attorney, Agent, or Firm* — Squire Patton Boggs (US) LLP

(57) ABSTRACT

A method and corresponding equipment for use by a mobile station and/or a radio access network, for altering one or more characteristics of transmissions of the mobile station to a base transceiver station of the radio access network in respect to power and/or modulation and/or coding of the transmissions, based on monitoring broadcast transmissions from other base transceiver stations of the radio access network and determining an estimate of the likelihood of transmissions by the mobile station interfering with communication between the other base transceiver stations and the mobile stations in communication with those other base transceiver stations.

24 Claims, 8 Drawing Sheets

OTHER-CELL INTERFERENCE-BASED UPLINK CONTROL

CROSS REFERENCE TO RELATED APPLICATION

Reference is made to and priority claimed from U.S. provisional application Ser. No. 60/793,419 filed Apr. 19, 2006.

BACKGROUND OF THE INVENTION

1. Technical Field

The present invention pertains to the field of telecommunications. More particularly, the present invention pertains to controlling power or other uplink resources of mobile stations, such as the modulation scheme and/or the channel coding used for communication with a radio access network.

2. Discussion of related art

The invention is relevant to EGPRS (enhanced general packet radio system) and EDGE (enhanced data rates for global evolution) in particular, but can be used in all FDMA (frequency division multiple access) based systems in which inter-cell and inter-sector interference affects network performance, such as e.g. 3.9G (3.9-generation) mobile telephone technology, i.e. a mobile phone technology based on 3G but with expanded capabilities approaching the capabilities provided by 4G.

As is commonly known, a cellular telephone network includes a radio access network having a number of wireless terminals, called base transceiver stations or Node Bs or having other designators depending on the kind of cellular system, all referred to here as base transceiver stations (BTSs). The cellular telephone network also includes a core network coupled to the radio access network and thus to the BTSs, but through an intermediate controller entity, called here a base controller station (BCS). Each BTS wirelessly couples to any user equipment (UE) wireless terminal in the area surrounding the BTS, such area being called here a cell. The BTS is said to serve the cell. Each cell can in turn be made up of several different sectors. Typically, any sector and any cell at least partially overlap with some other sector or cell. Thus, there can be inter-cell interference and also intra-cell or inter-sector interference.

The term UE or UE wireless terminal as used here is to be understood as synonymous with the term mobile station, and indicates any equipment including a mobile terminal enabling a user to wirelessly communicate with a radio access network of a cellular communication system/network.

Inter-cell/sector interference limits network performance in tight frequency reuse cellular networks. Power control (PC) is one mechanism to limit interference. In GSM (global system for mobile communication) networks, for example, circuit-switched (CS) speech and packet-switched (PS) services can be allocated to the same frequency resources. In such arrangements CS and PS services interfere with each other. As CS services typically have more strict quality criteria, CS service power control is usually not used to limit interference of the PS service by the CS service, but PS service power control can be used to limit interference caused by PS traffic.

Dual Symbol Rate (DSR) is a mechanism that has been proposed for improving the performance of uplink (a communication from a UE to a BTS, as opposed to downlink) in a GSM/EDGE network. DSR has been proposed in various 3GPP (3$^{rd}$ Generation Partnership Program) contributions. See for example GP-05261, Agenda Item 7.1.5.5, "Updates for Dual Symbol Rate Section of the Feasibility Study on Future GERAN Evolution," (GERAN stands for GSM EDGE radio access networks), 3GPP TSG (Technical Specifications Group) GERAN#27, Atlanta, USA.

In DSR, to improve uplink in a GSM/EDGE network, the symbol rate is doubled and the transmitter signal is allowed to overlap adjacent carriers. DSR nearly doubles uplink data spectral efficiency and is, therefore, a significant uplink capacity enhancement feature for the EDGE evolution.

The DSR carrier, however, overlaps with three normal carriers so that usage of DSR significantly increases network interference. With tight frequency reuse, significant interference in uplink is received by a BTS not only from adjacent sectors but also from surrounding cells.

Receivers with interference rejection combining (IRC) algorithms can mitigate interference and so usage of IRC receivers improves performance in a case of use of DSR (or other mechanisms tending to significantly increase inter-cell and inter-sector interference).

In a GSM system, the currently specified EGPRS uplink power control algorithm is based on the serving cell signal level, and optionally also on various specified quality measurements. (Both open and closed loop algorithms have been presented.) However, when power adjustment is made based only on the signal level and the quality measurements, the amount of interference occurring in neighboring cells is not taken into account, whereas if it were, sometimes a mobile station would be able to use more power than the signal level and quality measurements would indicate, and sometimes should use less. For example, in case of a path loss based open loop power control algorithm, if two mobile stations have the same path loss to a serving BTS the algorithm would call for the same power for both, but from the point of view of interference to communications between other BTSs and the mobiles being served by them, one of the two mobile stations might be able use a higher Tx (transmit/transmission) power than the other without causing unacceptable interference to the neighboring cells.

In other words, the problem is that when power control is based only on measurements of signals communicated between a UE and its serving BTS—e.g. path loss and C/I (carrier to interference) estimation—and interference to other cells is not considered, then sometimes the Tx power for the UE is unnecessarily limited. This decreases system capacity.

It would be advantageous, therefore, especially e.g. in case of DSR in a tight frequency reuse network, to base power control for a UE not only on measurements of signals between the UE and its serving BTS, but also on whether an increase in power would or would not tend to unacceptably impair communication in surrounding cells, which would depend on the amount of interference already present in the surrounding cells.

DISCLOSURE OF INVENTION

Accordingly, in a first aspect of the invention, a method is provided comprising: forming as an other-cell interference factor an estimate of a likelihood of a transmission from a mobile station to a serving transceiver of a radio access network interfering with communication between another mobile station and another transceiver of the radio access network, based on a measured level of a broadcast transmission of the other transceiver as received by the mobile station (and possibly based also on measured values of broadcast transmissions of still other transceivers of the radio access network). It should be understood that such an other-cell interference factor for a mobile station, which can then be used for power control and/or decisions on link adaptation, allows in effect taking into account whether a change in transmit power or link adaptation tending to increase interference in another cell, would result in unacceptably high interference in the other cell.

In accord with the first aspect of the invention, the mobile station may itself determine a value for the other-cell interference factor, and the method may further comprise the mobile station receiving the broadcast transmission from the other transceiver, and determining the measured level of the broadcast transmission of the other transceiver as received by the mobile station, and then altering characteristics of its communication with the serving transceiver, such as its power level, or its (channel) coding and/or modulation.

Also in accord with the first aspect of the invention, an element of the radio access network, such as either the serving transceiver or the controller of the serving transceiver, may determine a value for the other-cell interference factor, instead of the mobile station. The radio access network could then provide the mobile station with either power control commands or with commands to change its (channel) coding and/or modulation scheme (either one of which is a way of performing "link adaptation," as that term is used here).

The invention also encompasses corresponding equipment for a mobile station and for a transceiver and/or transceiver controller of a radio access network, computer program products for use by same, and application specific integrated circuits for use by same.

So according to the invention in at least some embodiments, an estimate of the interference already present in a surrounding cell, as indicated by the power level of a broadcast signal in the surrounding cell, is taken into account in determining the transmit power a mobile station is allowed to use, in addition to the serving cell measurements that are currently used, or in making link adaptation decisions, such as deciding when to switch from EGPRS to DSR and vice versa.

In an illustrative example, the invention provides the following:

1. Other-Cell Interference Factor

BTSs whose communications with mobile stations served by the BTSs—both uplink and downlink communications—are susceptible to interference from a potentially interfering mobile station served by a different serving BTS, can be defined based on the potentially interfering mobile station downlink measurements. In the GSM system, mobile stations have to measure BCCH (broadcast control channel) levels of neighboring cells, i.e. of neighboring BTSs. Because path loss is about the same in uplink and downlink, it can be assumed that the mobile station transmission interferes with uplink connections to any neighboring BTS for which the mobile station receives BCCH transmission, assuming there are overlapping carriers, i.e. assuming that the communication to a neighboring BTS uses carriers at frequencies that at least partially overlap the frequencies used for communication between the mobile station and its serving base station.

An other-cell interference factor for a mobile station—i.e. an other-cell interference estimate—can be generated according to the invention from the following information and measurements: the number of surrounding base stations susceptible to interference from the mobile station, and measured signal levels (i.e. e.g. path losses) to those base stations. The other-cell interference estimate could also include the other cell load conditions, frequency use by the other cell, and/or receiver types in use by the other cell, such as MRC (maximal-ratio combining) or IRC (interference-rejection combining) antennas, or four-antenna diversity antennas.

2. Mobile Station Transmit Power Adjustment Based on the Other-Cell Interference Factor and Serving Cell Measurements Power control according to the invention then uses the interference factor for uplink power adjustment. This way higher transmit powers can be allowed for a mobile station when higher transmit powers would not cause unacceptably high interference to surrounding cells. On the other hand, the mobile station transmit power would be limited more than in power control not taking into account potential interference to a surrounding cell (i.e. according to the prior art) in cases where even the transmit power that would be so allowed would be too high according to the invention, because it would cause too much interference to communications in the surrounding cells.

3. Link Adaptation, for Example Between EGPRS and DSR, Based on the Other-Cell Interference Factor and Also the Serving Cell Measurements DSR causes more interference than EGPRS since a DSR carrier overlaps with adjacent carriers. In a case when DSR is in use and interference to neighboring cells is determined to be too high according to the other-cell interference factor, EGPRS should be used instead, and vice versa.

Besides changing from DSR to EGPRS and vice versa, the invention encompasses using the interference estimate to change coding and/or modulation generally.

4. Rule for Determining Whether a Surrounding Cell Is One Which Should Be Considered The invention also provides a rule for determining whether a surrounding cell is one that should be considered in the other-cell interference estimate, a rule that is needed especially in cases where there are no overlapping carriers in the surrounding cells.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
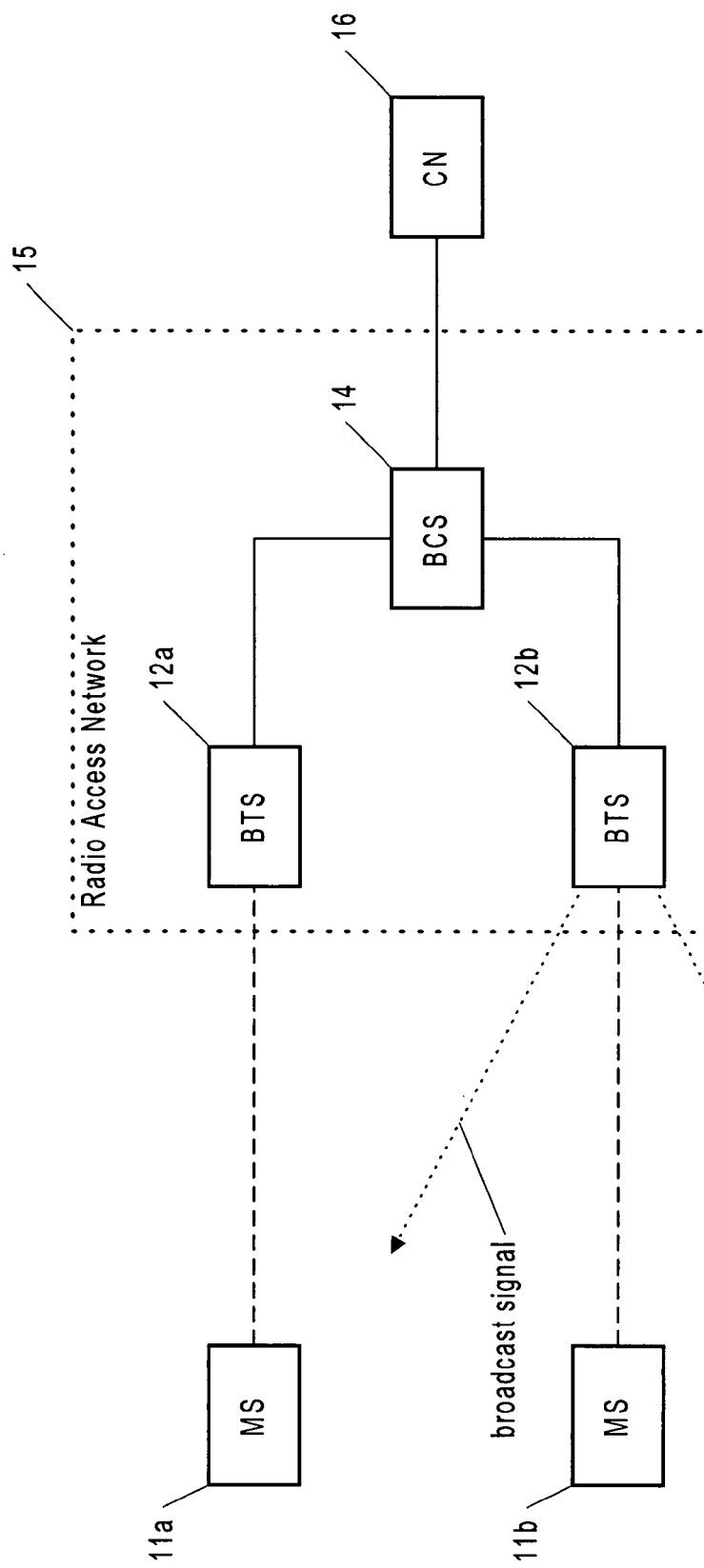
FIG. 1 is a block diagram/flow diagram of a mobile station receiving a broadcast transmission of a neighboring BTS, for use in determining the power level and/or its coding and/or modulation scheme of the mobile station, according to an embodiment of the invention.

Referring now to FIG. 1, a mobile station (MS) 11a is shown in communication with a BTS 12a of a radio access network 15, called the serving BTS for the mobile station. According to the invention, the mobile station adjusts characteristics of its communication with the serving BTS based on the received power of a signal broadcast by another BTS 12b in communication with another mobile station 11b, as well as other measurements known in the art (some optional), and in particular, based on the signal level of the serving BTS 12a. By taking into account the received power of the broadcast signal from the other BTS 12b, the mobile station can adjust the power it uses and/or the modulation and/or (channel) coding it uses in communicating with the serving BTS 12a so as to be less likely to cause interference with communications between the other BTS and the other mobile station 11b. To take into account the received power of the broadcast signals from the other BTS 12b and also other surrounding BTSs whose broadcast signals the mobile station is able to receive, and in some embodiments only those that have frequencies overlapping those of the serving BTS, the mobile station or the BTS or its controller BCS determines a value for what is here called an other-cell interference factor, I*.

In the case of UMTS (Universal Mobile Telecommunication System), the broadcast signal whose strength is used for determining I* is advantageously the BCCH (Broadcast Control CHannel) signal, but nothing about the invention requires that only the BCCH signal be used although whatever signal is used is broadcast, as opposed to point-to-point or point-to-multipoint, and for different kinds of networks, other broadcast signals may be used.

Providing the Other-Cell Interference Factor a) Rule for Determining Whether a Base Station Should Be Included in the Other-Cell Interference Factor In a typical application of the invention, there are several surrounding BTSs, each of which may be affected by uplink communications from a mobile station to its serving base station. The other-cell interference estimate according to the invention takes into account the existing interference present in the respective cells of all of these other BTSs according to one or another calculatory scheme, as described more fully below. (For example, the other-cell interference estimate can be a sum of terms each of which depends on a single respective BTS, or it can be an average of such terms, or it can be some other combination of such terms.)

To determine whether a surrounding base station should be included in the other-cell interference estimate, the downlink measurements by the mobile station can be used. According to one embodiment of the invention, it is assumed that the mobile station interferes with another BTS whose BCCH transmission it receives when the uplink carries used for communicating with the serving BTS and the other BTS overlap in frequency. In case of ⅓ reuse for EGPRS and ⅓ reuse for DSR, all cells have overlapping carriers, and adjacent channel interference exist between all cells with reuse ⅓ in case of EGPRS. For lower frequency reuse, only certain cells are mutually interfering, but this is not a big problem since interference-based power control is typically needed only in case of tight frequency reuse, as the networks with lower frequency reuse are more coverage limited. Regardless of frequency reuse, in case of closed-loop power and/or link adaptation control, a BCS (as opposed to a BTS it controls) can check for cells using the same or adjacent frequencies and so determine which other BTSs/cells to take into account in the other-cell interference factor.

b) Determining a Value for the Other-Cell Interference Factor

The other-cell interference factor, indicated here by I* generally, can be assigned a value based on measuring the signal level of the BCCH in each of the other cells determined to be those to be taken into account. The measured other-cell BCCH signal levels can be combined in various ways to arrive at a value for the other-cell interference factor, such as:

$$I^*_{avg} = \frac{1}{n}\sum_{i=1}^{n} B(I_i) \quad (1)$$

or $$I^*_{sum} = \sum_{i=1}^{n} B(I_i) \quad (2)$$

or $$I^*_{max} = \max_{i=1...n} B(I_i) \quad (3)$$

where $B(I_i)$ is the signal level of the BCCH of (other) cell i, as received by the mobile station for which the other-cell interference factor is being determined. Note that I* is a negative value. (The I* values are expressed in dBm, like all power values in power-control formulas, and so I* is negative for powers less than one milliwatt. The formula for power in dBm is: P in dBm=$10 \log_{10}${P (in mW)/1 mW}. For example, −100 dBm=$10^{-10}$ mW.)

Instead of a simple average, a cell-based weighting factor can be defined based on the other measurements, so that the interference factor is given by:

$$I^*_{avg} = \sum_{i=1}^{n} w_i B(I_i) \quad (4)$$

where $w_i$ is the cell-based weighting factor for cell i, and the weighting factors are normalized, so that:

$$\sum_{i=1}^{n} w_i = 1.$$

The cell-based weighting factor for a cell i can be based on one or more of the following: the BTS receiver type for cell i, the number of BTS receiver antennas for cell i, the frequency offset compared to the cell served by the serving BTS, the load conditions for cell i, and the number of overlapping frequencies between cell i and the serving cell.

The invention encompasses not only the above other-cell interference factor definitions, but also other definitions that provide a value for a surrounding cell that tends to be higher with the likelihood that interference in the other cell is higher and would tend to increase if the mobile station for which the interference factor is to be used, would use a higher uplink power or would perform link adaptation that would use a larger bandwidth.

New Mobile Station Power Control Algorithms Using the Other-Cell Interference Factor As explained above, the other-cell interference factor for a mobile station is for use in regulating transmit power of the mobile station and/or for use in link adaptation. For uplink power adjustment, the other-cell interference factor is used in addition to the serving cell signal level measurement(s) used according to the prior art.

Taking for example use of the invention in (E)GPRS, the prior art power control algorithm for (E)GPRS is set out in GSM 05.08 v8.22.0. According to that algorithm, the RF output power, $P_{CH}$, to be employed by a mobile station on each individual uplink PDCH (Physical Data CHannel) is given by:

$$P_{CH}=\min(\Gamma_0-\Gamma_{CH}-\alpha(C+48), \text{PMAX})$$

where:

$\Gamma_{CH}$ is a mobile station and channel specific power control parameter, sent to the mobile station in an RLC (radio link control) control message (as e.g. set out in 3GPP TS (Technical Specification) 04.60), and for those uplink PDCHs for which $\Gamma_{CH}$ has not been defined, a value of 0 is used;

$\Gamma_0$ is 39 dBm for GSM400, GSM900, and GSM850, but is 36 dBm for DCS1 800 and PCS 1900;

$\alpha$ is a system parameter, broadcast on PBCCH or optionally sent to the mobile station in an RLC control message (as set out in 3GPP TS 04.18 and 3GPP TS 04.60);

C is the normalized received signal level (for the EGPRS channel) at the mobile station as defined in 10.2.3.1 of GSM 05.08 v8.22.0; and PMAX is the maximum allowed output power in the cell, which is given by the parameter maximum CCH mobile transmit power for GPRS (often indicated as "GPRS_mobile station_TXPWR_MAX_CCH") if present, or simply the maximum CCH mobile transmit power ("mobile station_TX-PWR_MAX_CCH") otherwise.

Now in order to take into account the likelihood of unacceptably interfering with a neighboring cell, the other-cell interference factor I* is included in above mobile station power control algorithm (for (E)GPRS), and this can be done in various ways, for example as follows:

$$P_{CH}=\min(\Gamma_0-\Gamma_{CH}-\alpha(C+48)-\beta(I^*-\Gamma_{Iref}), \text{PMAX}) \qquad (5)$$

where:

$\Gamma_{Iref}$ is a reference interfering level serving as a mobile station and channel specific control parameter and is sent to the mobile station in an RLC control message (sent in a way similar to $\Gamma_{CH}$); and $\beta$ is a system parameter broadcast on PBCCH or optionally sent to the mobile station in an RLC control message (sent in a way similar to $\alpha$).

The parameters $\Gamma_{Iref}$ and $\beta$ give the radio access network full control over the usage of the other-cell interference factor. The parameter $\beta$ can have any value between 0 to 1, where a value of 0 disables the use of the other-cell interference factor, and a value of 1 fully enables it. The parameter $\Gamma_{Iref}$ is in effect used as a reference to which I* is compared (and is e.g. −100 dBm): if I*>$\Gamma_{Iref}$ then the mobile station power is decreased compared to the prior art, and if I*<$\Gamma_{Iref}$ then mobile station power is increased, in both cases compared to the value of the power as would be given by the prior art (E)GPRS power control algorithm.

Figure 2:
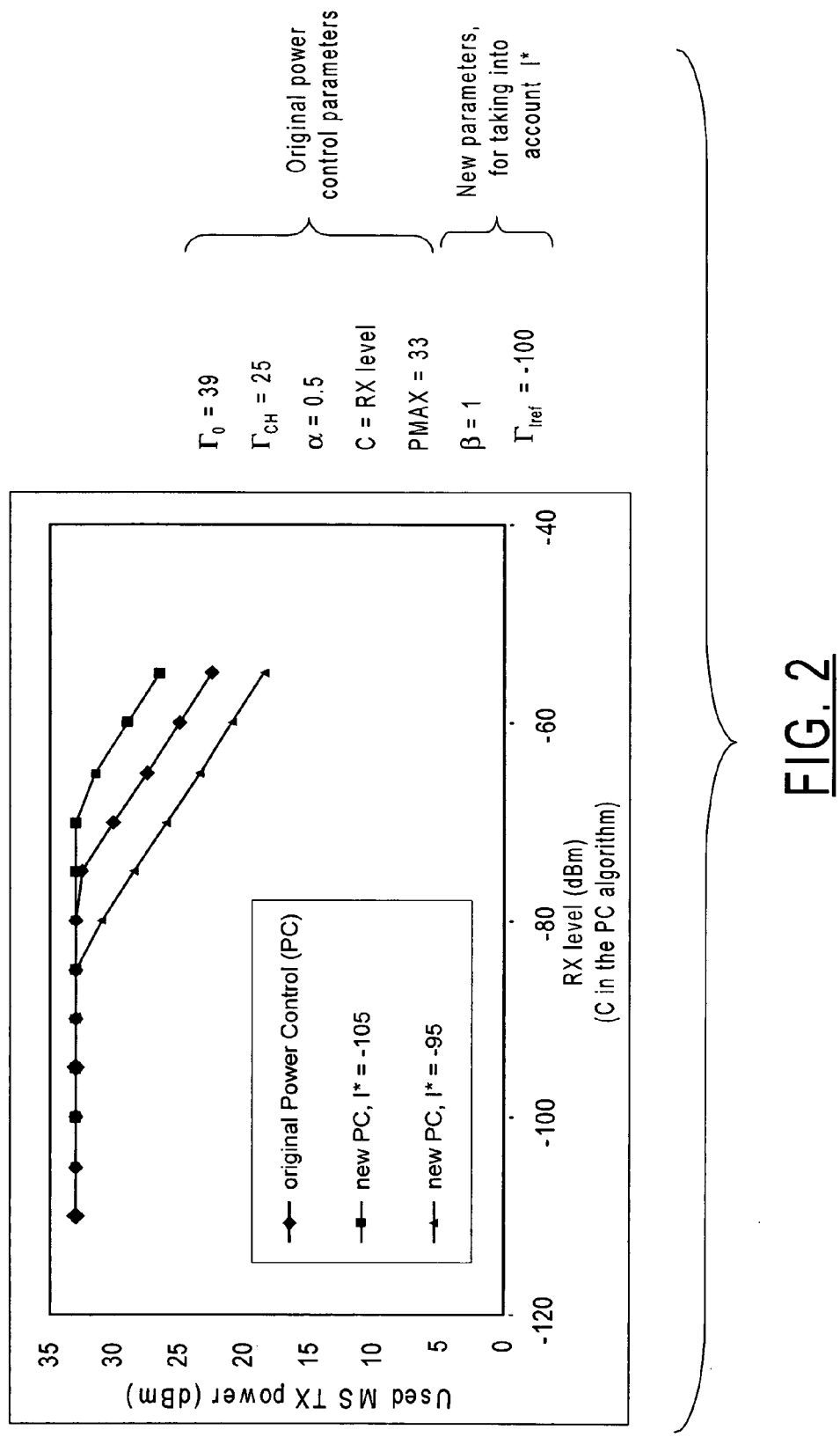
FIG. 2 is a graph showing allowed power levels with and without some embodiments of the invention, in case of EGPRS.

FIG. 2 shows the difference between power control according to the prior art (and so not taking into account potentially unacceptable interference with a neighboring cell) and power control according to the above illustrative example algorithm according to the invention. With the invention, lower transmit power levels are required than in the prior art when interference in other cells is estimated to be high already, and on the other hand, higher power is allowed when interference in other cells is estimated to be low, so that the interference to the other cells caused by an increase in the transmit power would not unacceptably degrade communications in the other cells.

In case of a mobile station using DSR, the maximum Tx power especially needs to be limited to ensure that interference to other cells is not too high. On the other hand, unnecessary power limitation should be avoided. In an exemplary embodiment of the invention, a mobile station power control algorithm for DSR could be:

$$P_{CH}=\min(\Gamma_0-\Gamma_{CH}-\alpha(C+48)-\beta(I^*-\Gamma_{Iref}), \text{PMAX},$$
$$\text{PMAX}-\Gamma_{DSR}-\beta(I^*-\Gamma_{Iref})) \qquad (6)$$

where $\Gamma_{DSR}$ is a DSR power reduction parameter that is a mobile station and channel specific control parameter, and is sent to the mobile station in a RLC control message (sent in a way similar to $\Gamma_{CH}$).

Compared to the illustrative power control algorithm provided by the invention for GSM generally, i.e. eq. (5), the DSR mobile station power control algorithm, i.e. eq. (6), differs only in that it includes a third power level threshold, PMAX−$\Gamma_{DSR}$−$\beta(I^*-\Gamma_{Iref})$, which includes a reference level $\Gamma_{DSR}$ specific to DSR. The DSR maximum Tx power is then (potentially) limited by $\Gamma_{DSR}$, but based on $\Gamma_{Iref}$ and I*.

Figure 3:
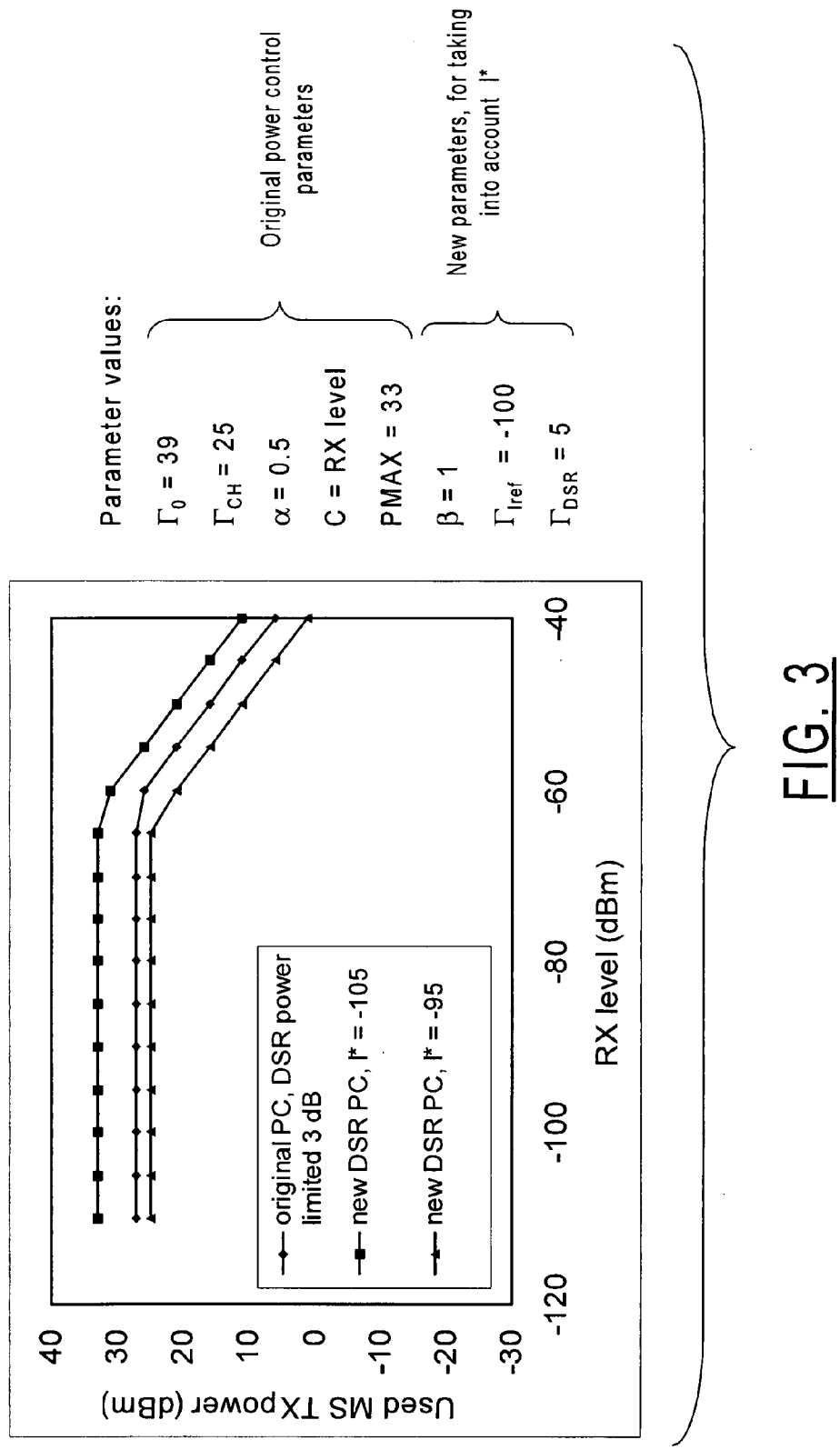
FIG. 3 is a graph showing allowed power levels with and without some embodiments of the invention, in case of DSR.
Figure 4:
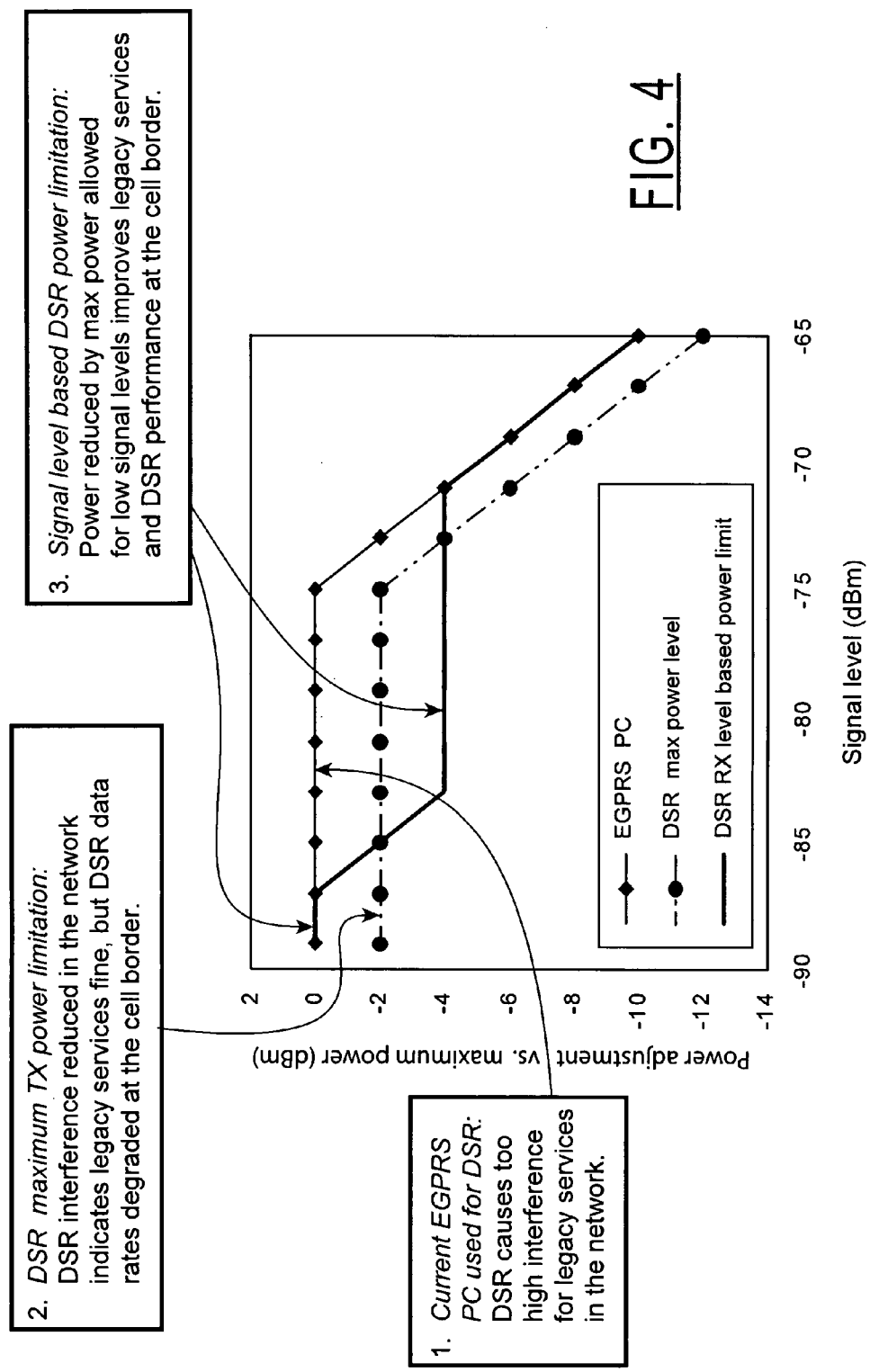
FIG. 4 is a graph illustrating DSR power control according to some embodiments of the invention.

Exemplary power adjustment curves for DSR are plotted in FIG. 3. As for GSM generally, in the exemplary embodiment for DSR, maximum power is limited only when it is estimated that there would be unacceptable interference in other cells, taking into account the interference already present in the other cells. The term PMAX−$\Gamma_{DSR}$−$\beta(I^*-\Gamma_{Iref})$ decreases when I* increases (assuming non-zero $\beta$), and takes into account the interference caused by DSR regardless of the interference already present in the other cells, through the term $\Gamma_{DSR}$.

It should be noted that DSR mobile station power control according to the invention, such as provided by eq. (6), can be used also for EGPRS traffic in the case where power needs to be limited for PS traffic to ensure acceptable service quality for CS traffic. In such an application, the DSR specific parameters would be replaced by PS EGPRS specific parameters.

Link Adaptation Between EGPRS and DSR Based on the Other-Cell Interference Factor Instead of or in addition to power control (for EGPRS or DSR or other applications, including e.g. PS EGPRS power control as noted above), link adaptation between EGPRS and DSR (or other link adaptations, i.e. other changes in coding and/or modulation) can be done based on an other-cell interference factor I* according to the invention.

Further, in case of deciding whether to do link adaptation based on I*, receiver types could also be taken into account in assigning a value to I*. A mobile station could change coding and modulation from that of DSR to that of EGPRS when I* indicates that too much interference is present in neighboring cells (on the theory that it is that way at least in part due to using DSR at the time a value is determined for I*). If later an appreciably lower value is determined for I*, the mobile station could resume using DSR. An algorithm for link adaptation could be used that is similar to that used for power control in that it includes reference signal levels used to regulate switching from DSR to EGPRS and vice versa, but in the case of link adaptation, the algorithm of course in effect simply yields a value that indicates only whether EGPRS or DSR should be used, not a value in a continuous range of values (which in case of power control, indicate a maximum allowed power).

In a particularly advantageous embodiment of the invention, power control and link adaptation should be combined so that the optimum modulation and power level pair can be selected.

Identifying Which BTSs/Cells Should Be Included in Assigning a Value to I*

As described above, the calculation of I* (i.e. the calculation used to assign a value to I*) for a mobile station need only make use of BCCH levels from cells/BTSs having frequencies overlapping with that of the cell of the mobile station. Since the BCS for the BTS serving the mobile station knows the frequencies in use in surrounding cells, the invention includes embodiments in which the BCS determines a value for I*, or at least assists the mobile station in determining a value for I*. In the latter kind of embodiment, the BCS sends a cell list to the mobile station identifying all cells that should be included in the calculation of I*. The mobile station then monitors for the broadcast transmissions only from the cells on the cell list and determines a value for I* based only on the BCCH signal levels received from these cells. The cell list can be provided as a broadcast signal or a common channel transmission or as a dedicated transmission, e.g. at registration with the serving BTS, if needed. (The registration could include signaling to indicate whether the mobile station has a cell list and/or the version it has, and only if the mobile station does not have a suitable cell list would a cell list be provided.) As mentioned above, the invention encompasses using weighting factors to take into account (among possibly other things) receiver types used by the BTSs of the cells being monitored, and in such embodiments, the mobile station must be provided with the BTS receiver types. These can be provided e.g. via a common channel transmission.

In other embodiments, the mobile station reports the levels for all broadcast signals it is able to receive (i.e. it can "hear"), and the BCS/BTS then determines a value for I* and sends the mobile station updated/new power control parameters based on changes in I*.

To determine a value for I* using weighting factors that take into account the BTS receiver types, a BTS receiver type list can be kept up to date at the BCS. In some embodiments, this list includes receiver types for all BTSs controlled by neighboring BCSs.

In a simpler embodiment, one in which even some BTSs without overlapping frequencies may be monitored, the mobile station determines the levels for all broadcast signals it is able to receive, and determines I* by itself. In a particularly simple embodiment, the mobile station uses the simple average given by eq. (1), not taking into account the receiver types of the BTSs whose BCCH the mobile is able to receive. The invention of course also encompasses embodiments where more complex calculations of I* are used, including those in which receiver types are taken into account, and including those calculations in which only cells with frequencies overlapping those of the serving cell are included in the I* calculation. For those calculations restricted to overlapping frequencies and/or accounting for receiver types, the mobile station must receive from the serving cell the list of cells having frequencies overlapping with the serving cell and/or the list of receiver types for the surrounding cells (or at least for the surrounding cells having frequencies overlapping with those of the serving cell).

Figure 5:
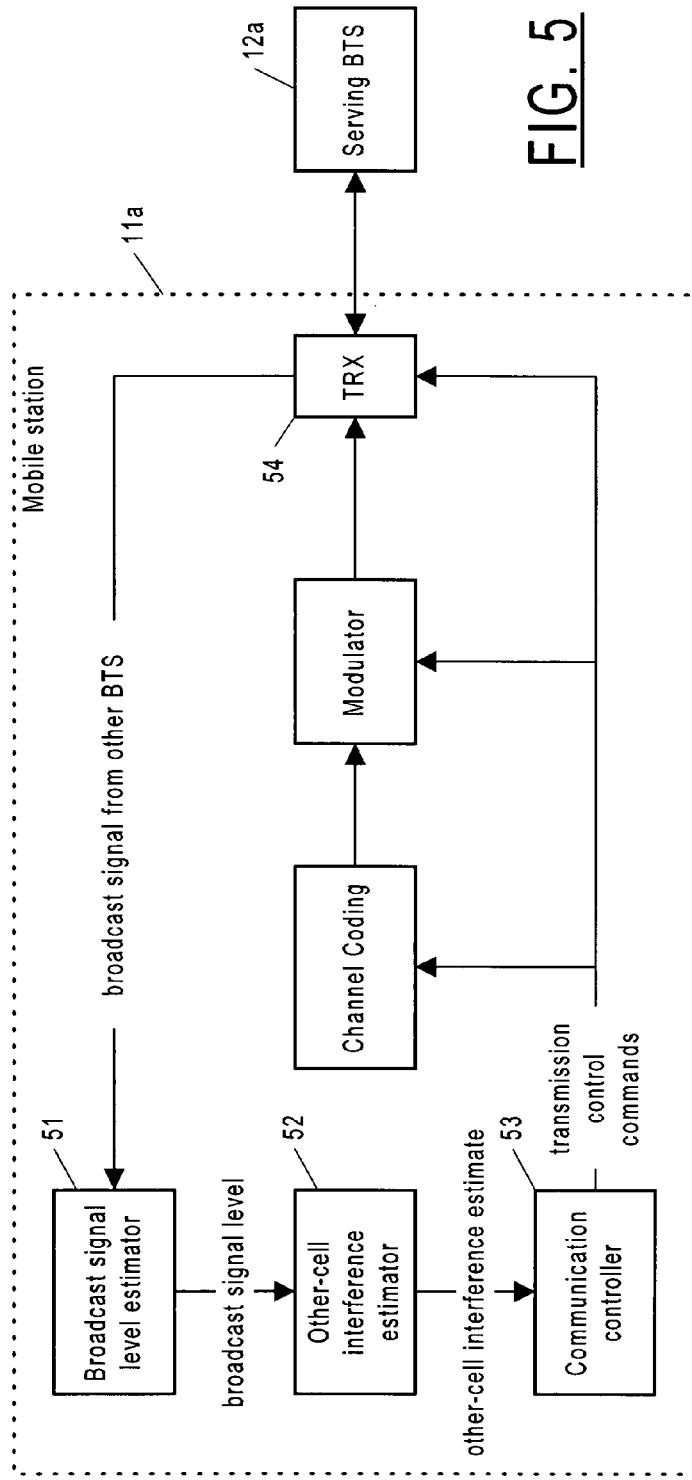
FIG. 5 is a block diagram of a mobile station according to an embodiment of the invention in which the mobile station estimates interference it may cause to a BTS other than its serving BTS.

FIG. 5 shows modules of the mobile station 11a of FIG. 1 relevant to the invention, for an embodiment of the invention in which the mobile station determines a value for I* (as opposed to it being determined by either the serving BTS or its controller BCS). As shown, the mobile station includes a transceiver (TRX) 54 that receives the broadcast signal of the other BTS 12b of FIG. 1 (and also typically of other BTSs), and provides it to a broadcast signal level estimator module 51, which determines a value indicative of the received power of the broadcast signal. The value is provided to an other-cell interference estimator module 52, which provides a value for the other-cell interference factor I* as described above (typically also taking into account the broadcast signal level for other BTSs). The value of I* is passed to a communications controller 53, which can then provide a control signal indicating a change in coding to a channel coding module, and/or a control signal to a modulator for indicating a change in modulation scheme, and/or a control signal to the TRX, indicating a change in power to be used in uplink.

Figure 6:
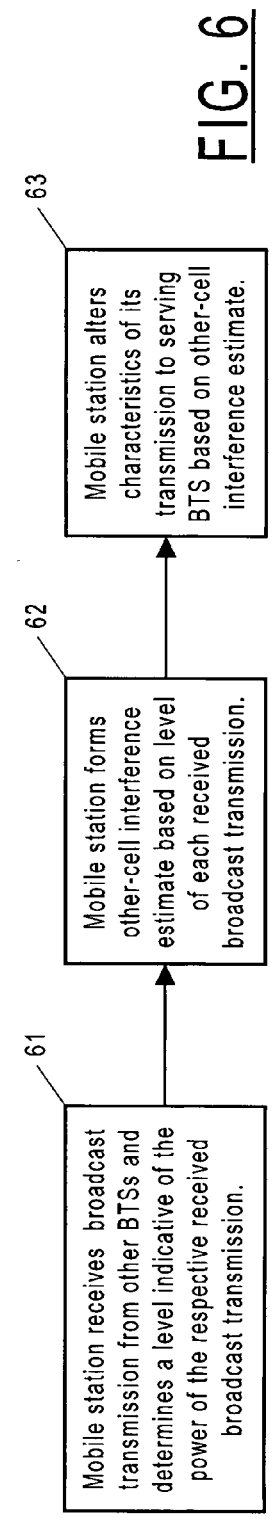
FIG. 6 is a flow chart of operation of a mobile station according to an embodiment of the invention.

FIG. 6 illustrates steps of operation of the mobile station 11a of FIG. 5, i.e. in case of an embodiment in which the mobile station 11a itself determines a value for the other-cell interference factor I*. In a first step 61, the mobile station receives a broadcast transmission (e.g. the BCCH signal in case of UMTS) from the BTS 12b, which is 1 out of n BTSs whose broadcast transmission the mobile station 11a is able to receive, and determines/estimates a level for each broadcast transmission i (indicated here as $B(I_i)$) as received by the mobile station, the level being indicative of the power of the broadcast transmission i as received the mobile station. In a next step 62, the mobile station 11a determines a value for I* based on the n $B(I_i)$'s, using for example any of the rules given by eqs. (1)-(4) for assigning a value for I* yield the same value (although in case of rule (4) the receiver types of the other BTSs must be communicated or otherwise known to the mobile station, and if only those cells with overlapping frequencies are to be included, then the mobile station must be told which these are or this information must be accessible to the mobile station). In a next step 63, the mobile station 11a alters characteristics of its transmission to the transceiver 12a based on I*, characteristics such as the power level used in uplink and/or the channel coding and/or the modulation scheme (and so e.g. changes from EGPRS to DSR or vice versa).

Figure 7:
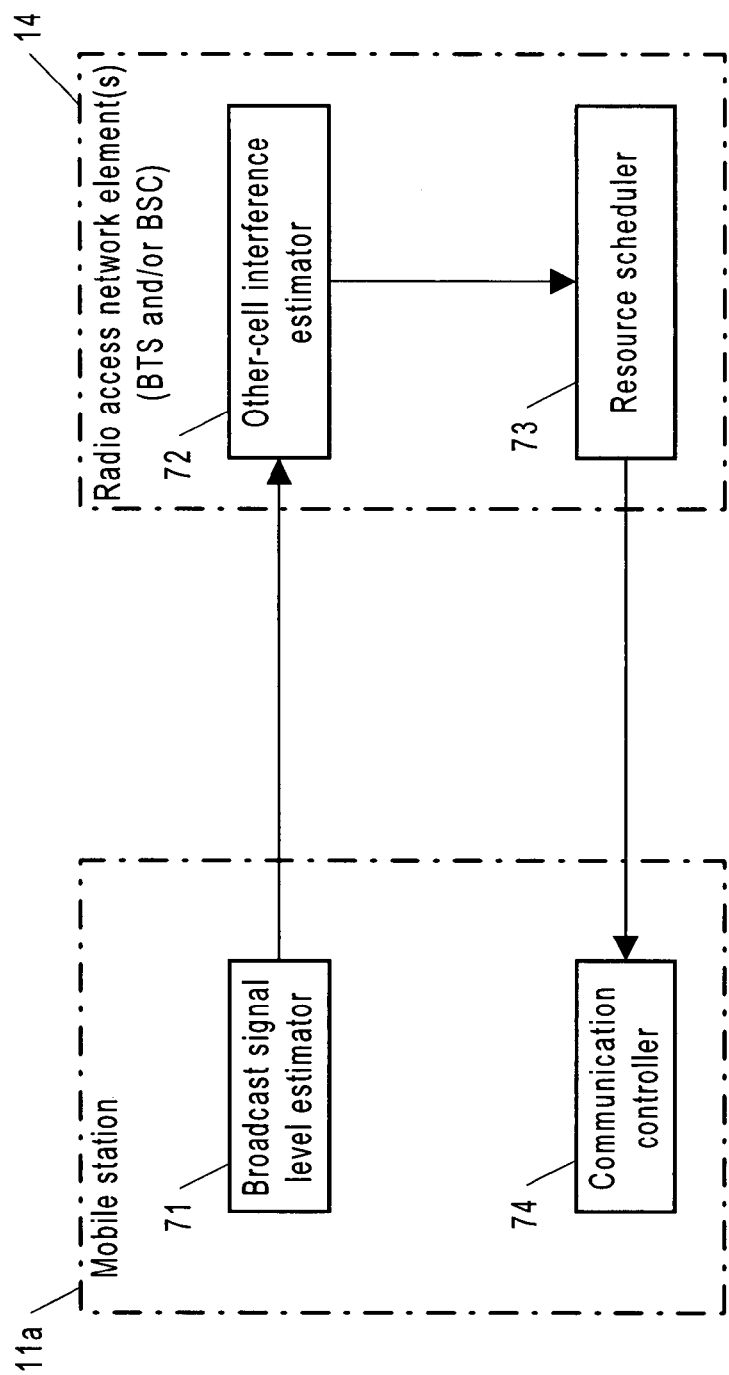
FIG. 7 is a block diagram of a mobile station and base controller station according to an embodiment of the invention in which the base station controller estimates other-cell interference the mobile station of FIG. 1 may cause to a BTS other than its serving BTS.

FIG. 7 shows components relevant to the invention, for the mobile station 11a and the portion of the radio access network including the serving BTS, for an embodiment in which the radio access network, not the mobile station, determines a value for I*. In the embodiment illustrated in FIG. 7, the mobile station 11a includes a broadcast signal level estimator 71 that determines the level of the broadcast signals of other than the serving BTS, and provides the levels, along with associated information indicative of the identities of the other BTSs, to the radio access network. The serving BTS of the radio access network receives the broadcast signal levels and the associated information. The serving BTS or, more typically, its controller BCS includes an other-cell interference estimator 73 for determining the other-cell interference estimate I* based on the signal levels and the associated information (possibly using a weighted average or sum or other combination), and provides the value for the interference estimate I* to a resource scheduler 73 (for allocating to the mobile station 11a consumable resources for uplink, such as Tx power or coding or modulation or any combination of same). The resource scheduler 73 sends commands to (ultimately) the communication controller 74, commands that are based on the interference estimate (as well as other factors, including those known in the art). The commands can be for example a power adjustment or a command to change coding or modulation.

Figure 8:
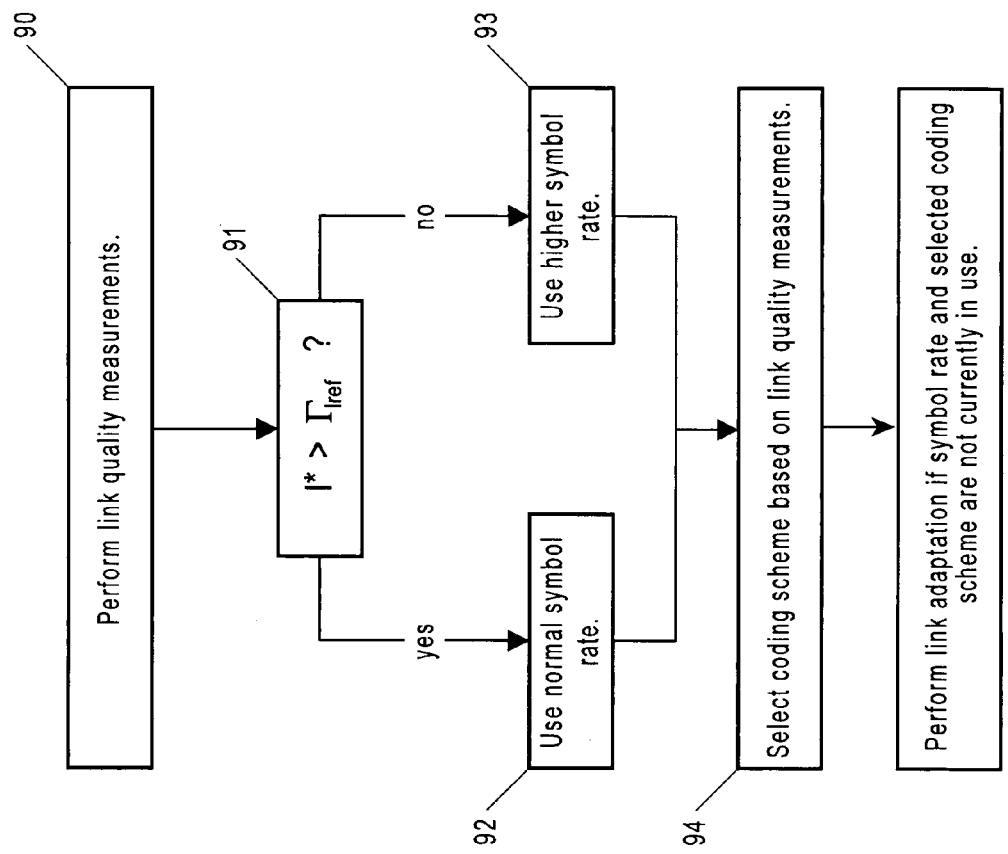
FIG. 8 is a flowchart illustrating link adaptation based on an embodiment of the invention.

Referring now to FIG. 8 and also to FIG. 1, an example is illustrated of link adaptation, in this case between EGPRS and DSR, using the invention to decide whether to use DSR and so a higher symbol rate, or EGPRS and so a lower symbol rate. By way of background, EGPRS includes nine modulation and coding schemes. The modulation is either 8 PSK (8 phase shift keying) or GMSK (Gaussian minimum shift keying). Both produce EDGE a 3-bit word for every change in carrier phase. The five highest bit rates (after channel coding) use 8 PSK. DSR also includes a plurality of modulation and coding schemes, with higher bit rates than for any modulation and coding scheme of EGPRS.

Now, still referring to both FIG. 8 and FIG. 1, in deciding whether to perform link adaptation according to the invention to change from EGPRS to DSR or vice versa, in a first step 90, the mobile station 11a performs link quality measurements. In a next step 91, the mobile station or the serving BTS 12a or the BCS 14 or even an element of the core network 16 determines whether $I^* > \Gamma_{Iref}$. If so, meaning that there is a greater likelihood of interfering with communication in a neighboring cell than if I* were smaller, then in a next step 92, a decision is made (by the mobile station or an element of the radio access or core network) to use the normal/lower symbol rate, i.e. an EGPRS rate. On the other hand, if $I^* < \Gamma_{Iref}$, then the observed interference in neighboring cells is small enough to allow a higher symbol rate, and so a decision is made to use a higher symbol rate, i.e. a DSR rate. Irrespective of the outcome of the comparison of I* and $\Gamma_{Iref}$, in a next step 94, a coding scheme is selected (by the mobile station or an element of the radio access or core network) based on the link quality measurements. Selecting the coding scheme determines the bit rate, which determines the modulation scheme.

It should be understood that the invention encompasses any link adaptation based on comparing I* to $\Gamma_{Iref}$, not only link adaptation from one or another modulation and coding scheme of EGPRS to DSR or vice versa. Thus, the invention encompasses using a comparison of I* to $\Gamma_{Iref}$ as a basis for deciding whether to change from any higher symbol rate transmission scheme to any lower symbol rate scheme, even within a family of coding and modulation schemes. Thus, e.g. the invention encompasses link adaptation from one modulation and coding scheme of EGPRS to another modulation and coding scheme of EGPRS.

The functionality provided by the invention described above can be implemented as software modules stored in a non-volatile memory of a mobile station and/or one or more elements of a radio access network. In other words, the software modules include instructions, executable by a computer processor in the mobile station and/or the radio access network, by which the mobile station or one or more elements of the radio access network operates so as to have the functionality described above. Thus, the signal level estimator modules 51 and 71, the interference estimator modules 52 and 72, the resource scheduler module 73, and the communication controller modules 54 and 74 can be provided as one or more software modules. Alternatively, the functionality provided by such software modules can instead be provided in whole or in part by an ASIC (application specific integrated circuit). Any software module can in turn be provided as a (standalone) computer program product comprising a computer readable storage structure embodying computer program code indicative of instructions, executable by a computer processor in a device (e.g. a mobile station), by which the device operates so as to have the functionality described above.

Figure 9:
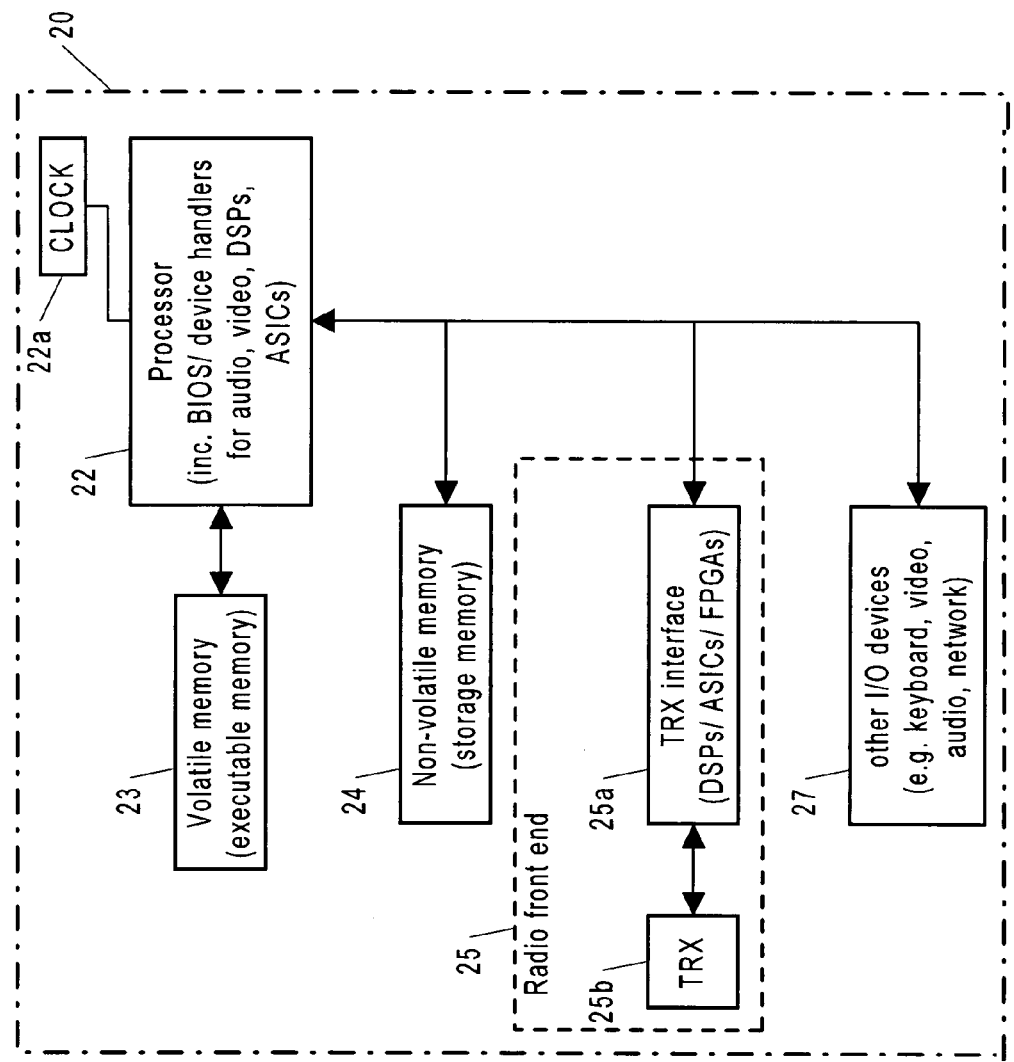
FIG. 9 is a block diagram of a wireless communication terminal, which could serve as a mobile station or as a base transceiver station of a radio access network, and includes components that are the same as could be included in a base controller station of the radio access network.

FIG. 9 shows some components of a wireless communication terminal 20, which could be the mobile station 11a and/or could be the BTS 12a of FIG. 1. The communication terminal includes a processor 22 for controlling operation of the device, including all input and output. The processor, whose speed/timing is regulated by a clock 22a, may include a BIOS (basic input/output system) or may include device handlers for controlling user audio and video input and output as well as user input from a keyboard. The BIOS/ device handlers may also allow for input from and output to a network interface card. The BIOS and/or device handlers also provide for control of input and output to a radio front end 25 including a transceiver (TRX) 25b and a TRX interface 25a, the TRX interface including possibly one or more digital signal processors (DSPs), application specific integrated circuits (ASICs), and/or field programmable gate arrays (FPGAs). The TRX enables communication over the air with another similarly equipped communication terminal. The communication terminal 20 may also include (especially in case of a user equipment communication terminal as opposed to a BTS communication terminal) other I/O (input/output) devices, such as a keyboard and a mouse or other pointing device, a video display, a speaker/microphone, and also a network interface (card), allowing wireline communication with other communication terminals, and in particular such communication over the Internet.

Still referring to FIG. 9, the communication terminal 20 typically includes volatile memory, i.e. so-called executable memory 23, and also non-volatile memory 24, i.e. storage memory. The processor 22 may copy applications (e.g. a calendar application or a game) stored in the non-volatile memory into the executable memory for execution by the processor. The processor functions according to an operating system, and to do so, the processor may load at least a portion of the operating system from the storage memory to the executable memory in order to activate a corresponding portion of the operating system. The functionality described above (for both a base station or other component of a radio access network and for a UE) can be implemented as software modules stored in the non-volatile memory 24, and executed as needed by the processor, after copying all or part of the software into the executable memory 23, sometimes called RAM (random access memory). Alternatively, the logic provided by such software can also be provided by an ASIC (application specific integrated circuit).

As mentioned, the communication terminal 20 of FIG. 9 includes a radio front end 25. The communication terminal of FIG. 9 could be illustrative not only of the mobile station 11a and the BTS 12a, but also the BCS 14 of FIG. 1, although typically a BCS does not include a radio front end, and is instead in wireline communication with its BTSs and with the core network.

In case the invention is implemented at least in part as software, the so-implemented portion can be provided as a computer program product, including a computer readable storage structure embodying computer program code—i.e. the software—thereon for execution by a computer processor. An example is a so-called floppy disk having instructions for performing a method according to the invention, as set out above, encoded on the disk in machine (processor) readable form.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A mobile station, comprising:
at least one processor and at least one memory including computer program code
configured to, with the at least one processor, cause the
mobile station to perform at least the following:

receive, when communicatively coupled to a transceiver of
a radio access network of a wireless communication
system, a broadcast transmission of another transceiver
of the radio access network;

measure a signal value indicative of the power of the
received broadcast transmission of the other transceiver;
and determine an other-cell interference factor at least in part
based on the measured signal value of the received
broadcast transmission of the other transceiver, wherein
the other-cell interference factor is indicative of a likelihood of a transmission from the mobile station interfering with a communication between another mobile
station and the other transceiver of the radio access network.

2. The mobile station of claim 1, wherein the mobile station is caused to further perform: alter one or more characteristics of the transmission of the mobile station based on the determined other-cell interference factor.

3. The mobile station of claim 2, wherein the mobile station is caused to perform:
provide the other-cell interference factor to the radio access network; and
receive, from the transceiver of the radio access network, a command to alter one or more characteristics of the transmission of the mobile station.

4. The mobile station of claim 3, wherein the command comprises a command to adjust the power level of the transmission of the mobile station, and the mobile station is caused to determine a power setting by comparing a maximum allowed output power with an output power calculated using a sum of terms including a term expressible as:

$$-\beta(I^* - \Gamma_{Iref}),$$

in which $I^*$ is the other-cell interference factor, $\beta$ is a system parameter broadcast on a control channel by the transceiver or sent to the mobile station in a radio link control message, and $\Gamma_{Iref}$ is a reference interfering level sent to the mobile station from the transceiver of the radio access network.

5. The mobile station of claim 3, wherein the command comprises a command to change coding and/or modulation used in making the transmission of the mobile station.

6. The mobile station of claim 3, wherein the command comprises a command to change from a higher symbol rate to a lower symbol rate or vice versa.

7. The mobile station of claim 3, wherein the command comprises a command to change from a dual symbol rate transmission to an enhanced general packet radio system transmission or vice versa.

8. The mobile station of claim 1, wherein the mobile station is caused to weight the other-cell interference factor by at least one of the following items of information: the type of the transceiver of the radio access network, the number of receiver antennas of the transceiver, the offset of the frequency of the transmission from the frequency of the transmission from the other mobile station to the other transceiver or from the frequency of the transmission from the other transceiver to the other mobile station, a value indicative of loading of the bandwidth for communication between the other transceiver and the other mobile station, and the number of frequencies used in communicating with the transceiver overlapping the frequencies used in communicating with the other transceiver.

9. The mobile station of claim 1, the mobile station is caused to receive a transceiver type from the transceiver via a common channel transmission.

10. The mobile station of claim 1, further comprising a transceiver for said communicatively coupling to said transceiver of a radio access network.

11. A system, comprising a radio access network, and a mobile station as in claim 1.

12. A system as in claim 11, wherein the radio access network comprises a plurality of transceivers, each responsive to a signal indicating receiver type information, each configured to broadcast the receiver type information.

13. An apparatus, comprising:
at least one processor
and at least one memory including computer program code configured to, with the at least one processor, cause the apparatus to perform at least the following:
receive, from a mobile station, a signal value indicative of the power of a broadcast transmission of another transceiver as received by a mobile station;
determine an other-cell interference factor indicative of a likelihood of a transmission from the mobile station interfering with a communication between another mobile station and the other transceiver of the radio access network; and
transmit to the mobile station a command to alter one or more characteristics of the transmission of the mobile station based on the other-cell interference factor.

14. The apparatus of claim 13, wherein the apparatus comprises a transceiver of a radio access network of a wireless communication system, communicatively coupled to the mobile station.

15. A method, comprising:
receiving, by a mobile station when communicatively coupled to a transceiver of a radio access network of a wireless communication system, a broadcast transmission of another transceiver of the radio access network;
measuring a signal value indicative of the power of the received broadcast transmission of the other transceiver; and
determining an other-cell interference factor at least in part based on the measured signal value of the received broadcast transmission of the other transceiver, wherein the other-cell interference factor is indicative of a likelihood of a transmission from the mobile station to the transceiver of the radio access network interfering with communication between another mobile station and the other transceiver.

16. The method of claim 15, further comprising altering one or more characteristics of the transmission of the mobile station based on the other-cell interference factor.

17. The method of claim 16, wherein the one or more characteristics of the transmission comprises the power level.

18. The method of claim 17, wherein to alter the power level of the transmission a power setting is determined by comparing a maximum allowed output power with an output power calculated using a sum of terms including a term expressible as:

$$-\beta(I^* - \Gamma_{Iref}),$$

in which $I^*$ is the other-cell interference factor, $\beta$ is a system parameter broadcast on a control channel by the transceiver or sent to the mobile station in a radio link control message, and $\Gamma_{Iref}$ is a reference interfering level sent to the mobile station from the transceiver of the radio access network.

19. The method of claim 16, wherein the one or more characteristics of the transmission comprises the coding and/or modulation used in making the transmission.

20. The method of claim 16, wherein the altering of one or more characteristics of the transmission comprises a changing from a higher symbol rate to a lower symbol rate or vice versa.

21. The method of claim 15, wherein the altering of one or more characteristics of the transmission comprises a changing from coding and modulation for dual symbol rate transmission to coding and modulation for enhanced general packet radio system transmission or vice versa.

22. The method of claim 15, further comprising: weighting the other-cell interference factor by at least one of the following items of information: the type of the transceiver of the radio access network, the number of receiver antennas of the transceiver, the offset of the frequency of the transmission from the frequency of the transmission from the other mobile station to the other transceiver or from the frequency of the transmission from the other transceiver to the other mobile station, a value indicative of loading of the bandwidth for communication between the other transceiver and the other mobile station, and the number of frequencies used in communicating with the transceiver overlapping the frequencies used in communicating with the other transceiver.

23. A computer program product comprising a computer readable storage structure embodying computer program code thereon for execution by a computer processor, wherein said computer program code comprises instructions for performing a method according to claim 15.

24. An application specific integrated circuit provided so as to operate according to a method as in claim 15.

\* \* \* \* \*